(12) United States Patent (10) Patent No.: US 8,215,606 B2
Haynes et al. (45) Date of Patent: Jul. 10, 2012

(54) VARIABLE STIFFNESS SUPPORT

(75) Inventors: David F. Haynes, Arlington, TX (US); David L. Williams, Colleyville, TX (US); Michael R. Smith, Colleyville, TX (US); Robert J. Pascal, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 299 days.

(21) Appl. No.: 12/642,151

(22) Filed: Dec. 18, 2009

(65) Prior Publication Data

US 2010/0102194 A1 Apr. 29, 2010

Related U.S. Application Data

(62) Division of application No. 10/515,391, filed on Nov. 22, 2004.

(51) Int. Cl.
*F16M 13/00* (2006.01)
*F16M 1/00* (2006.01)
*F16M 11/00* (2006.01)
*F16D 3/00* (2006.01)

(52) U.S. Cl. .......... 248/635; 464/75; 74/606 R; 267/136

(58) Field of Classification Search ................ 74/606 R, 74/89.17, 411, 604, 425, 443; 180/444; 310/51; 381/71.8; 464/75; 248/635; 267/136
See application file for complete search history.

(56) References Cited

U.S. PATENT DOCUMENTS

| 1,780,727 | A | * | 11/1930 | Tenney | 464/75 |
| 5,040,764 | A | * | 8/1991 | Dubois | 248/635 |
| 5,692,410 | A | * | 12/1997 | Fenelon | 74/411 |
| 5,796,849 | A | * | 8/1998 | Coleman et al. | 381/71.8 |
| 6,059,274 | A | * | 5/2000 | Owen et al. | 267/136 |
| 2008/0066348 | A1 | * | 3/2008 | O'Brien et al. | 36/100 |
| 2008/0083835 | A1 | * | 4/2008 | Girardi et al. | 238/29 |

OTHER PUBLICATIONS

Specification dated May 21, 2003 from PCT/US03/15913.
Office Action dated Jun. 12, 2003 from PCT/US03/15913.
Notice of Priority Document dated Jul. 8, 2003 from PCT/US03/15913.
Response dated Aug. 7, 2003 from PCT/US03/15913.
Publication dated Dec. 4, 2003 from PCT/US03/15913.
International Search Report dated Apr. 5, 2004 from PCT/US03/15913.
Written Opinion dated Jul. 29, 2004 from PCT/US03/15913.
Response to Written Opinion dated Aug. 27, 2004 from PCT/US03/15913.
International Preliminary Examination Report dated Jan. 5, 2005 from PCT/US03/15913.
Preliminary Amendment dated Sep. 3, 2009 from U.S. Appl. No. 10/515,391.
Publication dated Oct. 13, 2005 from U.S. Appl. No. 10/515,391.
Non Final Office Action dated May 20, 2008 from U.S. Appl. No. 10/515,391.
Response dated Jun. 18, 2008 from U.S. Appl. No. 10/515,391.

(Continued)

*Primary Examiner* — Vinh T. Luong
(74) *Attorney, Agent, or Firm* — James E. Walton; Richard G. Eldredge

(57) ABSTRACT

A variable stiffness support has a support housing that is configured to adjust the orientation of an internal elastomer assembly. The support housing includes an adjustment mechanism, and the elastomer assembly includes an outer ring that encircles an elastomeric material, a central bushing embedded in the elastomeric material, and a plurality of shims embedded in the elastomeric material in a parallel planar fashion.

9 Claims, 6 Drawing Sheets

OTHER PUBLICATIONS

Non Final Office Action dated Aug. 21, 2008 from U.S. Appl. No. 10/515,391.
Amendment dated Nov. 19, 2008 from U.S. Appl. No. 10/515,391.
Final Office Action dated Dec. 23, 2008 from U.S. Appl. No. 10/515,391.
Amendment After Final dated Feb. 11, 2009 from U.S. Appl. No. 10/515,391.
Advisory Action dated Feb. 26, 2009 from U.S. Appl. No. 10/515,391.
RCE dated Nov. 13, 2009 from U.S. Appl. No. 10/515,391.
Non Final Office Action dated Apr. 3, 2009 from U.S. Appl. No. 10/515,391.
Amendment dated Jul. 1, 2009 from U.S. Appl. No. 10/515,391.
Notice of Allowance dated Sep. 3, 2009 from U.S. Appl. No. 10/515,391.
Non Final Office Action dated May 10, 2007 from CN 100408910.
Non Final Office Action dated Sep. 7, 2007 from CN 100408910.
Notice to Grant Patent Application dated Apr. 3, 2008 from CN 100408910.
Chinese Patent No. 100408910 dated Aug. 6, 2008.
Indian Examination Report in Indian counterpart application No. 1688/KOLNP/2004, issued by Government of India Patent Office on Aug. 2, 2010.
Office Action dated Mar. 25, 2009 from CA Application 2,484,843.
Response dated Sep. 18, 2009 from CA Application 2,484,843.
Office Action dated Oct. 17, 2005 from EP 1506353.
Response dated Feb. 2, 2006 from EP 1506353.
Notice for Granting Patent Application dated Apr. 18, 2006 from EP 1506353.
European Patent No. 1506353 dated Aug. 11, 2006.

* cited by examiner

VARIABLE STIFFNESS SUPPORT

CROSS REFERENCE TO RELATED APPLICATIONS

This application is a Divisional of U.S. application Ser. No. 10/515,391 mow U.S. Pat. No. 7,650,819, having a filing date or 371(c) date of 22 Nov. 2004, titled "VARIABLE STIFFNESS SUPPORT," which was the National Stage of International Application No. PCT/US03/15913, filed on 21 May 2003, titled "VARIABLE STIFFNESS SUPPORT," which claims the benefit of U.S. Provisional Application No. 60/382,295, having a filing date of 21 May 2002, titled "VARIABLE STIFFNESS SUPPORT". U.S. application Ser. No. 10/515,391 is hereby incorporated by reference for all purposes as if fully set forth herein.

BACKGROUND OF THE INVENTION

1. Field of the Invention

The present invention relates to devices that provide vibration attenuation and isolation at structural joints and attachments.

2. Description of Related Art

Mechanical vibration is a term that describes oscillatory motion resulting from fluctuating forces acting on a dynamic system, that is, a system of mass and elastic elements. In certain situations, these motions can become excessive, causing reduced life, improper function, and possible failure of the system. This is especially important in regard to aircraft, or more specifically, rotorcraft structures, where failure of the structure may result in loss of life or aircraft. Excessive vibration within these structures may also lead to discomfort or sickness of passengers or crew, impairing safe operation of the aircraft. Effective control of vibrations is very important in this and other applications.

Of primary interest is the resonant condition, where masses and elastic members vibrate at or near their natural frequency. Referring to FIGS. 1A and 1B in the drawings, a simple dynamic system 11 where resonance can occur is illustrated schematically and with a plot, respectively. As is shown, a mass 13 is supported by a spring 15 and a damper 19 attached to a moving support 17. The motion of support 17 is oscillatory in the vertical direction. For this system, the natural frequency is simply the frequency at which mass 13 would oscillate if displaced and let go, with support 17 not moving. When support 17 is moving, the resulting motion of mass 13 with respect to support 17 depends upon the amplitude and frequency of the motion of support 17. If the driving frequency of support motion f becomes equal to the system natural frequency fn, resonance occurs, which results in very large motions of mass 13 for systems that are lightly damped. This is typical of many components and structures, and is illustrated on a plot 21 in FIG. 1B, where the maximum motion X of mass 13 with respect to the motion Y of support 17 occurs when f/fn=1.

For dynamic systems in general, a resonant condition is undesirable and potentially destructive, and should be avoided. This can be accomplished by controlling the driving frequency f and/or the natural frequency fn, or by incorporating sufficient damping. For many systems, such as helicopters, the driving frequency f remains almost constant, i.e., rotor at constant RPM, and sufficient damping is hard to implement without additional weight. As a result, avoiding resonance requires controlling the system natural frequency fn, so that the natural frequency fn is never equal to the driving frequency f. This can be done by either changing the mass or the stiffness properties of the system. Because the mass is usually fixed, the only remaining adjustment is the stiffness of the system.

The simple model of FIGS. 1A and 1B can be extended to more complex systems having multiple mass and stiffness elements, such as helicopter or tilt-rotor airframes. For these systems, multiple driving frequencies from the vibrating rotor combined with the distributed mass and stiffness throughout the airframe create a complex problem in vibration control. Historically, this problem has been overcome by isolating the structure from vibrating components, i.e., rotors, pylons, etc., and/or by building the structure very stiff, so that the system natural frequencies remain higher than any driving frequencies in the system. These frequency isolation methods are simple, but cannot be incorporated without adding significant weight to the airframe structure.

Current efforts to extend the state of the art involve the development of dynamically tailored airframe structures that are "adaptive," or able to change their dynamic characteristics as desired. By changing the stiffness properties of the structures, the structures are able to "de-tune" themselves from adverse resonant conditions, allowing less stiff and potentially lighter structures.

In absence of an effective and practical means to change the stiffness of elastic members in dynamic systems, vibration is often controlled by isolating vibrating components. In a broad context, isolation simply means allowing the vibrating components to move independently, as much as possible, in such a way as to minimize transmitted forces to the remaining system. This type of vibration control is commonly done by supporting or connecting the vibrating components with flexible elements. As applied to a helicopter, a common method of achieving this is by supporting the fuselage from the vibrating rotor and pylon using elastomeric supports acting as springs.

A model of a simple helicopter dynamic system 20 is illustrated in FIGS. 2A and 2B in the drawings. As is shown, a rotor/pylon 23 is supported by a spring 25 and a damper 29 attached to a fuselage 27. The frequency response of system 20 is shown in a plot 31 of FIG. 2B. As shown in the far right of plot 31, the relative motion X of fuselage 27 with respect to the motion Y of rotor/pylon 23 becomes small when the natural frequency fn is much smaller than the frequency of motion f of rotor/pylon 23. In this system, the softer the spring 25, the lower the natural frequency fn, and corresponding motion X of fuselage 27. With regard to vibration isolation, any support in such an application should be as soft as possible. However, if spring 25 is too soft, excessive deflections can occur as rotor loads change.

U.S. Pat. No. 4,362,281 issued to Cresap et al. is based upon this principle, and embodies a soft spring support for isolation of the vibrating rotor/pylon during steady flight conditions. To prevent excessive deflections during changing flight conditions and variations in rotor thrust, mechanical stops are incorporated that "bottom out" and limit motion during these transient conditions. Thus, in the Cresap et al. system, the system stiffness changes from relatively soft to effectively very stiff at the limits of pylon motion.

In some dynamic helicopter systems, dynamic components themselves are used as supports between the helicopter rotor/pylon and the fuselage. The dynamic antiresonant vibration isolator (DAVI) is an example of such an approach. A simple model of DAVI system 41 is illustrated in FIG. 3. In DAVI system 41, a fuselage mass 43 is attached to a rotor/pylon 45 using a spring element 47 in parallel with a weight 49 on a lever 51. The mechanical advantage of weight 49 and lever 51 can be tailored so that when rotor/pylon 45 is oscillating at a particular frequency, the inertial and spring forces acting on fuselage 43 through a lever pivot 53 and spring element 47 are equal and opposite, so that, theoretically, no net forces are acting on the fuselage.

The devices disclosed in U.S. Pat. No. 6,247,684 issued to Manfredotti and U.S. Pat. No. 4,365,771 issued to Halwes are based upon the DAVI principle. Manfredotti discloses a dynamic component intended for use as a support between a helicopter rotor/pylon and fuselage, and Halwes discloses a liquid inertia vibration isolator. In these devices, the net forces acting on the structure are minimized, thereby limiting vibration. These devices, however, are only effective within a narrow frequency band of operation, and may not provide adequate isolation as rotor rpm, flight, or operating conditions change.

The rotary beam variable stiffness wing spar described in U.S. Pat. No. 6,000,660 issued to Griffin et al. discloses a variable stiffness element for use in dynamically tailored airframe structures. In the Griffin et al. device, the wing spar is a non-rectangular beam, having different bending stiffness depending upon the orientation of the beam and loading. When rotated within the wing, the stiffness and dynamic properties of the wing can be varied. The Griffin et al. device is very large and heavy, and difficult or impractical to implement in but a few locations.

Although the foregoing designs represent considerable advancements in the area of vibration isolation and control, many shortcomings remain.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DETAILED DESCRIPTION OF THE PREFERRED EMBODIMENT

Figure 1A:
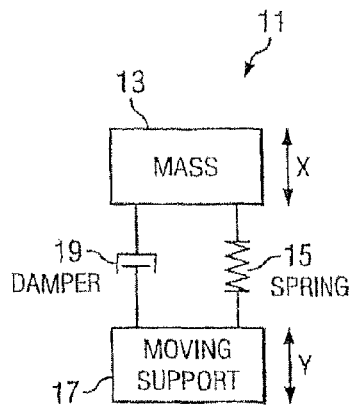
FIG. 1A is a schematic of a simple dynamic system.
Figure 1B:
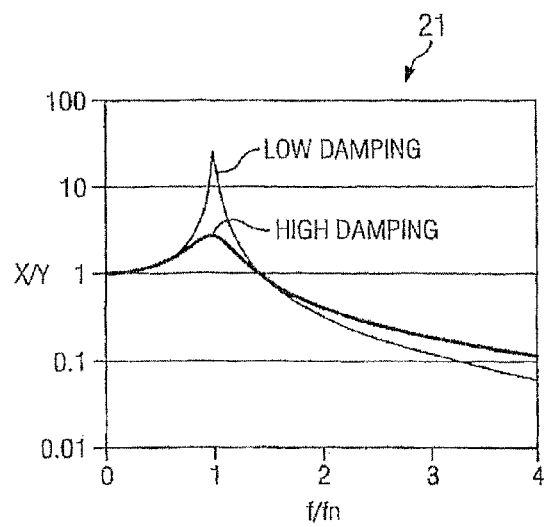
FIG. 1B is a plot of the frequency response of the dynamic system of FIG. 1A.
Figure 2A:
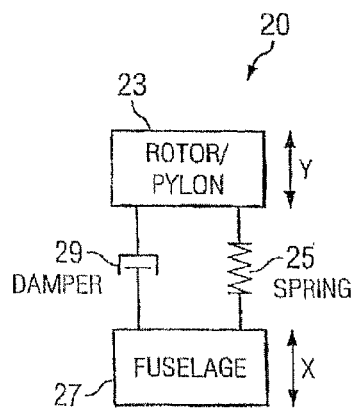
FIG. 2A is a schematic of a simple dynamic system for a helicopter.
Figure 2B:
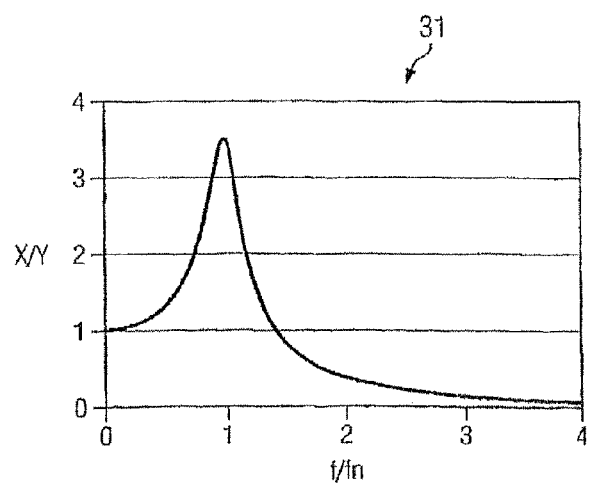
FIG. 2B is a plot of the frequency response of the dynamic system of FIG. 2A.
Figure 3:
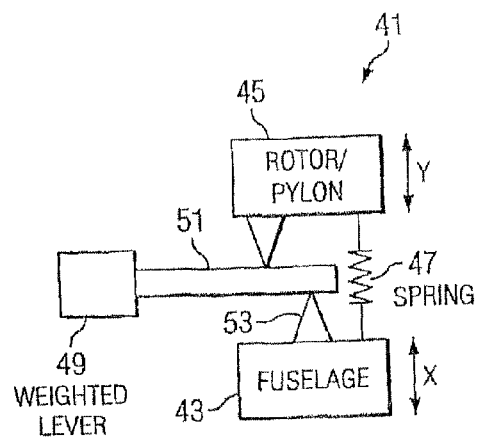
FIG. 3 is a schematic of a Kaman dynamic antiresonant vibration isolator.
Figure 4:
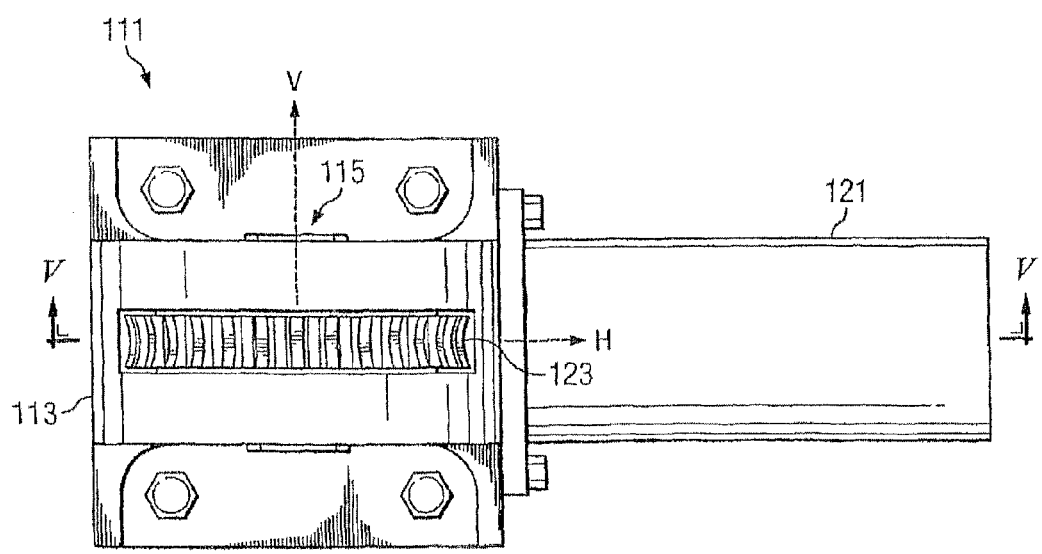
FIG. 4 is a top view of a variable stiffness support according to the present invention.
Figure 5:
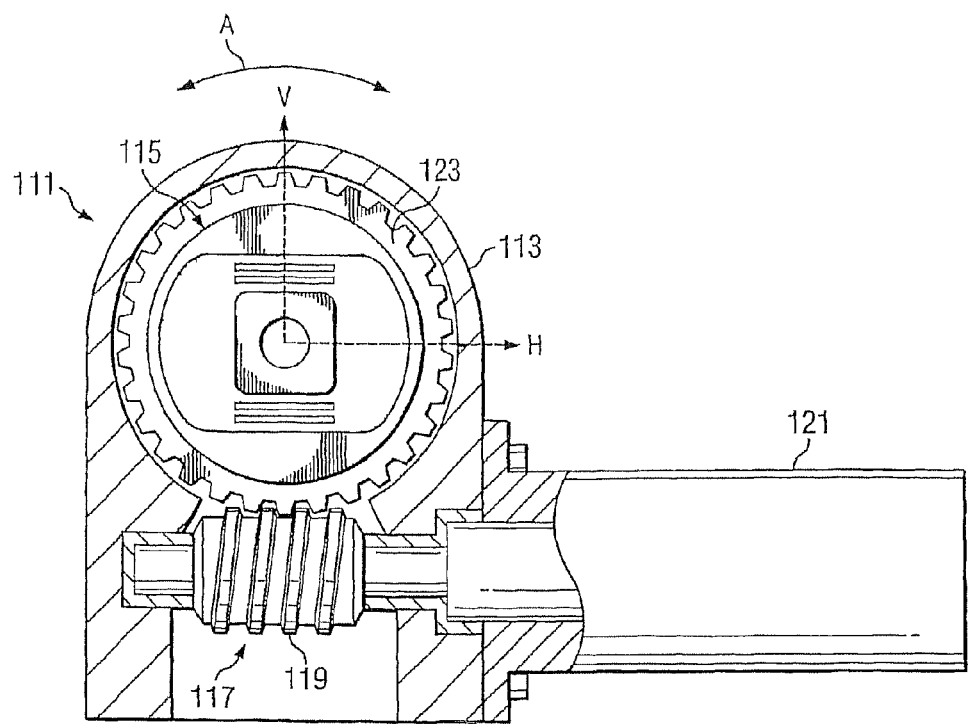
FIG. 5 is a partial cross-sectional view of the variable stiffness support of FIG. 4 taken a V-V.

Referring now to FIGS. 4 and 5 in the drawings, a variable stiffness support 111 according to the present invention is illustrated. Variable stiffness support 111 provides for avoiding resonance by controlling the natural frequency of a system by adjusting the stiffness of the system. Variable stiffness support 111 functions as a variable stiffness spring. Variable stiffness support 111 is configured in such a way as to provide a different stiffness dependent upon the orientation of the elastomer assembly with respect to the direction of an applied load or deflection. When applied to dynamic systems, the present invention provides a simple means for changing the system natural frequencies and responses to applied harmonic forces. This allows selective "tuning" of a system away from resonant conditions, where vibrations and forces are high and potentially destructive. As such, variable stiffness support 111 is particularly well suited to provide variable stiffness at structural joints or attachments.

Variable stiffness support 111 includes a support housing 113 that is configured to adjust the angular orientation of an internal elastomer assembly 115. In the preferred embodiment, support housing 113 houses an adjustment mechanism 117 for adjusting the angular orientation of elastomer assembly 115 about a central axis 114 (see FIG. 7) in the direction of arrow A. In the preferred embodiment, adjustment mechanism 117 is a worm gear assembly having a worm 119 driven by a gear motor 121, and an external gear 123 coupled to elastomer assembly 115 that is configured to mate with and be driven by worm 119. Gear motor 121 is configured to controlled and actuated remotely, for example, by a pilot in the cockpit of an aircraft.

Figure 6:
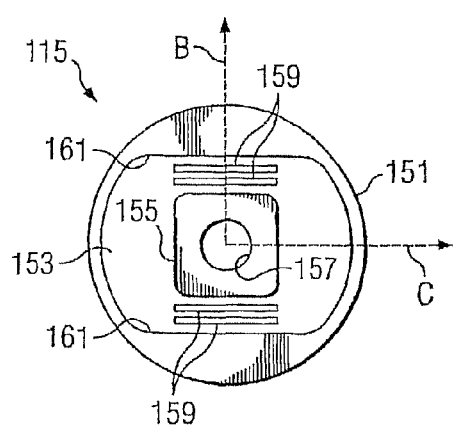
FIG. 6 is a front view of the elastomer assembly of the variable stiffness support of FIG. 4.
Figure 7:
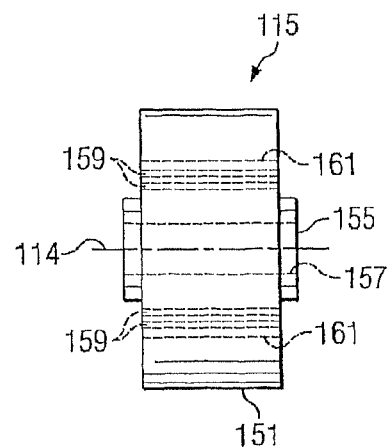
FIG. 7 is a top view of the elastomer assembly of FIG. 6.
Figures 8A, 8B:
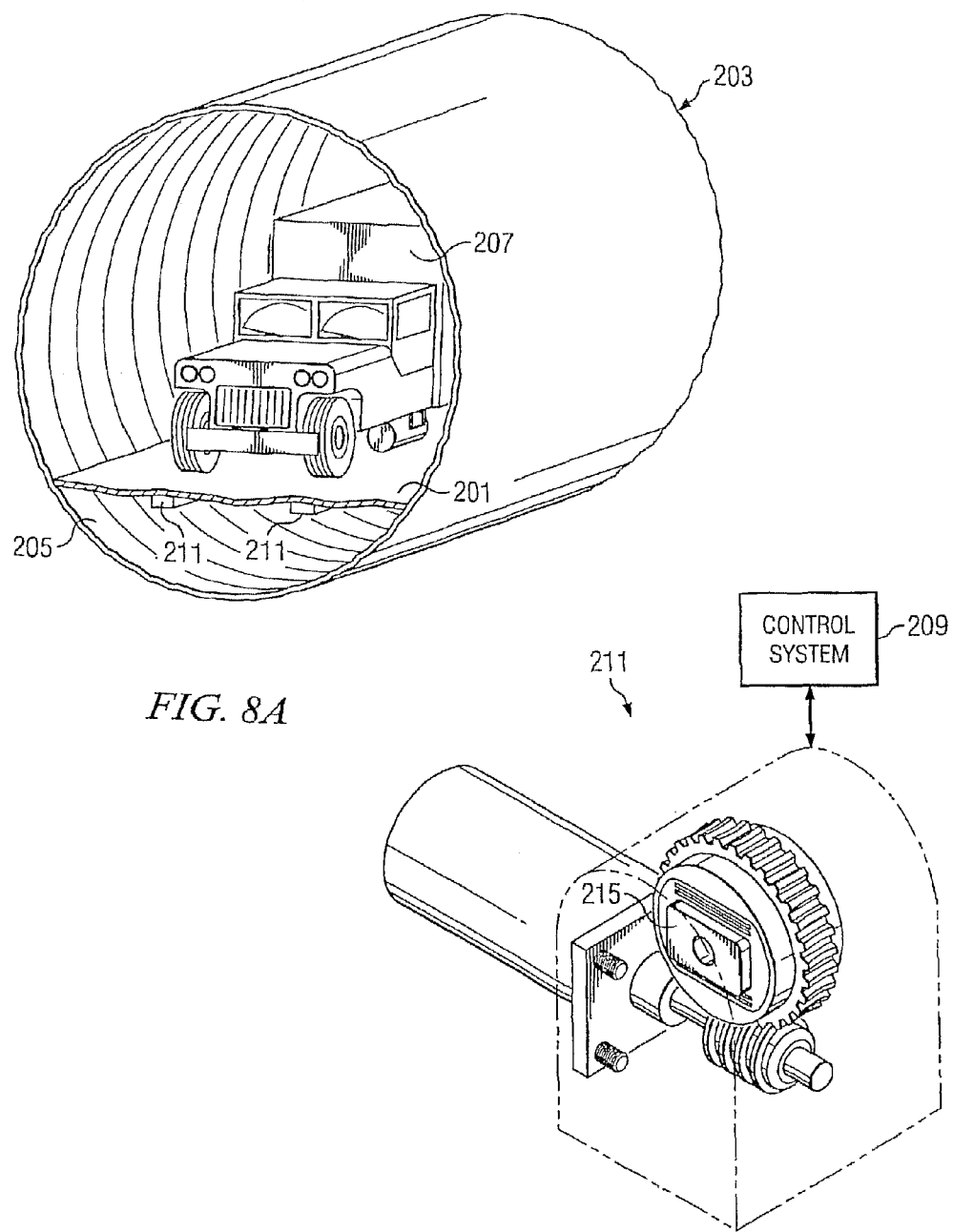
FIG. 8 is a schematic of an adaptive stiffness floor mount application utilizing a plurality of the variable stiffness supports of FIG. 4.

Referring now to FIGS. 6 and 7 in the drawings, elastomer assembly 115 is illustrated. Elastomer assembly 115 includes an outer ring-shaped housing 151 that surrounds an elastomeric material 153. A central bushing 155 having a central aperture 157 is embedded in elastomeric material 153. Bushing 155 preferably has a generally square or rectangular cross-sectional area with the corners rounded off. Bushing 155 may also be elongated with rounded ends as shown in FIG. 8. A plurality of thin rigid shims 159 are embedded in elastomeric material 153 in a parallel planar fashion on both sides of bushing 155. Shims 159 are preferably aligned parallel with opposing sides of bushing 155. In the preferred embodiment, the interior surface of outer ring-shaped housing 151 is annular in shape, except for two opposing internal chord surfaces 161 that are aligned parallel with bushing 155 and shims 159. This parallel stacking configuration of bushing 155, shims 159, and chord surfaces 161 provides for a relatively high stiffness in the direction indicated by arrow B, and a relatively low stiffness in the direction of arrow C.

In operation, forward and reverse actuation of gear motor 121 rotates elastomer assembly 115, thereby changing the orientation of elastomer assembly 115. Changes in the orientation of elastomer assembly 115 changes the stiffness of variable stiffness support in the directions of arrows B and C. Variable stiffness support 111 provides the ability to tailor the stiffness characteristics of dynamic systems or structures.

Referring now to FIG. 8 in the drawings, one application for which variable stiffness support 111 is particularly well suited is illustrated. In this application, a plurality of variable stiffness supports 211 are installed underneath a loaded cargo floor 201 of a cargo bay 203 of an aircraft, forming an adaptive stiffness floor. Variable stiffness supports 211 form an interconnected distributed array that is driven and controlled by a control system 209. Control system 209 and variable stiffness supports 211 provide the ability to selectively change the stiffness between loaded cargo floor 201 and an adjacent fuselage structure 205. A cargo mass 207 is associated with the local variable stiffness to preclude resonance problems. Thus, variable stiffness supports 211 provide the ability to de-tune the airframe from harmful resonant conditions.

Depending upon the orientation of elastomer assemblies 215, significant changes in stiffness may be accomplished, thereby providing a wide range of adjustment for various loading conditions. Because no mechanical stops are used, the stiffnesses of variable stiffness supports 211 are continuously variable over the entire range of adjustment, not just at the limits of certain components.

Control system 209 includes neural networks or random optimization methods, such as genetic algorithms. In the preferred embodiment, an algorithm known as "simulated annealing" is used. Simulated annealing is a random optimization method, similar to genetic algorithms; however, unlike genetic algorithms, simulated annealing uses a single solution that "walks" through the design space and "learns" the topology of the objective function. In this manner variable stiffness supports 211 allow for reduced vibration and weight, increased payload and range, and less wear of parts resulting from reduced vibration. It should be understood that this concept of an adaptive stiffness floor may be utilized in a wide range of cargo transport applications, not just cargo aircraft.

Figure 9:
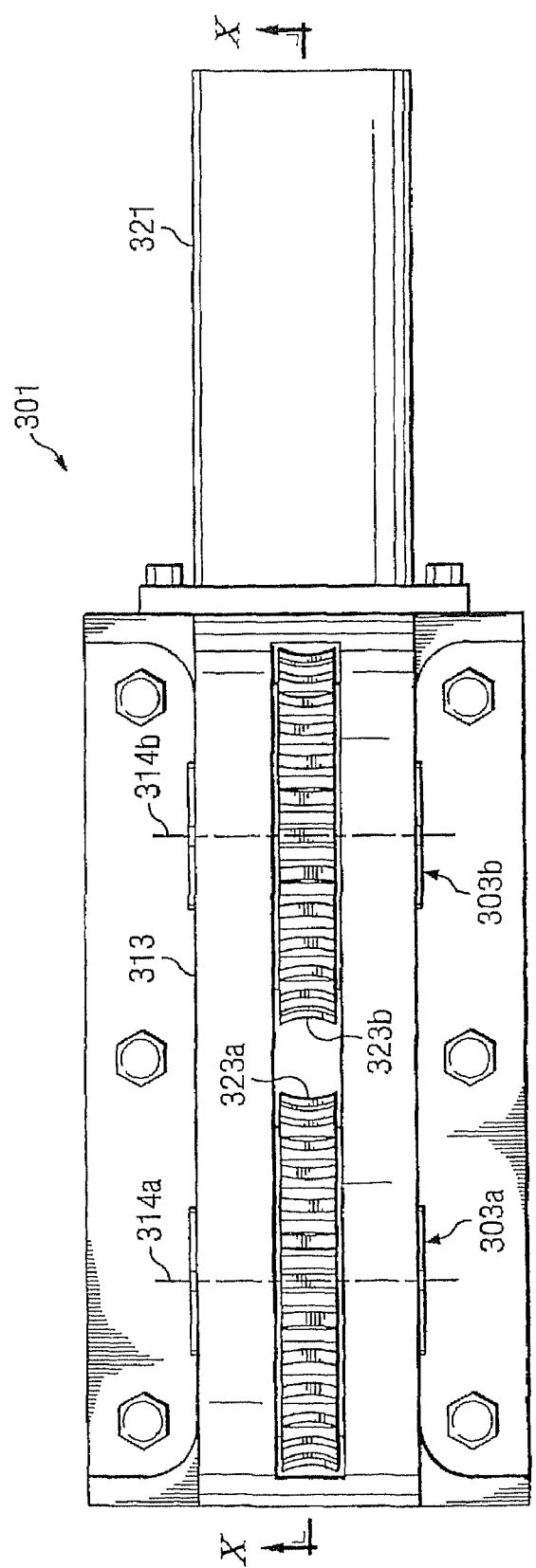
FIG. 9 is a top view of an alternate embodiment of the variable stiffness support according to the present invention.
Figure 10:
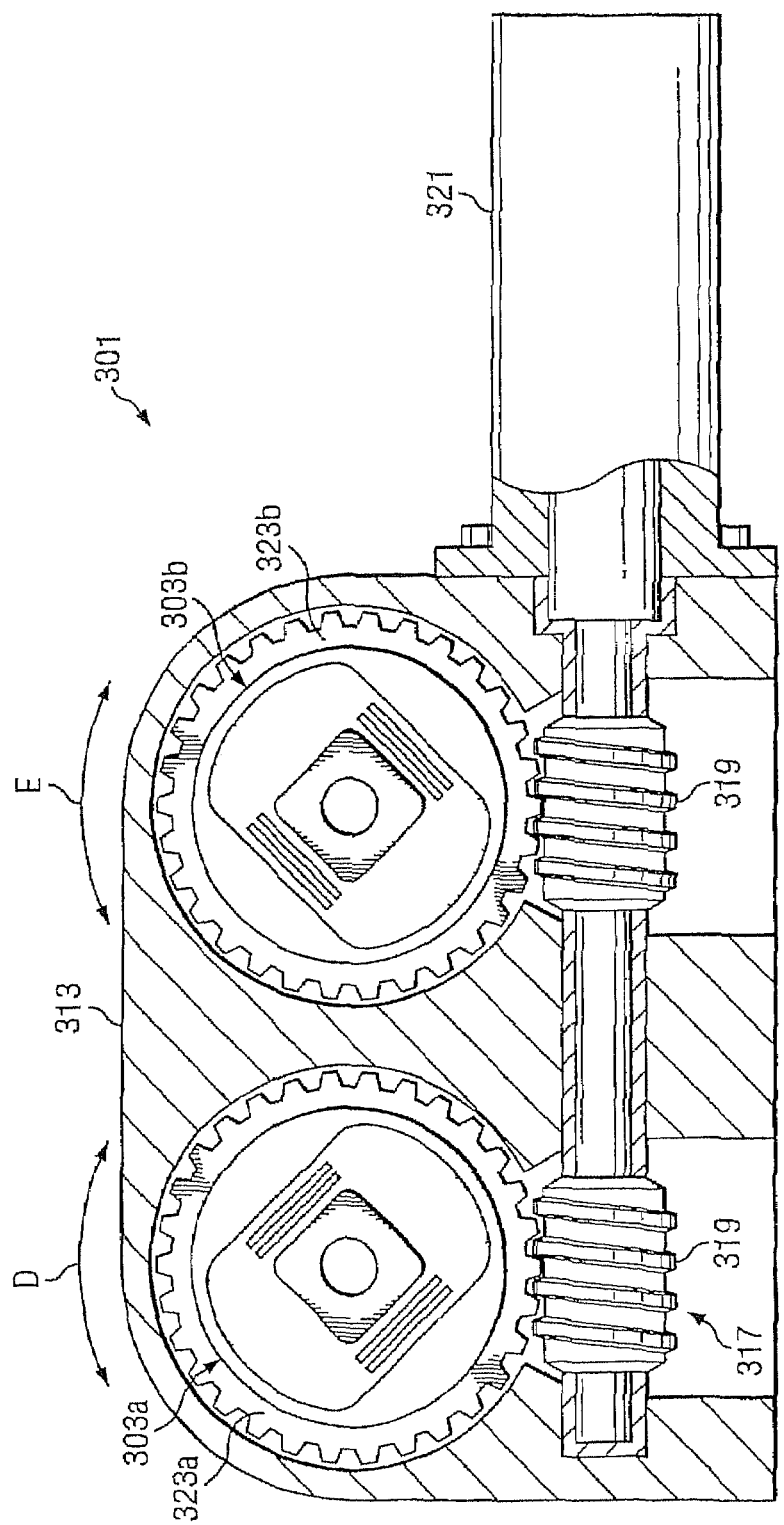
FIG. 10 is a partial cross-sectional view of the variable stiffness support of FIG. 9 taken at X-X.

Referring now to FIGS. 9 and 10 in the drawings, an alternate embodiment of the variable stiffness support according to the present invention is illustrated. In this embodiment, a variable stiffness support 301 includes two collocated, counter-rotating elastomer assemblies 303a and 303b. Elastomeric assemblies 303a and 303b are preferably identical in form and function as elastomeric assembly 115. Variable stiffness support 301 includes a support housing 313 that is configured to adjust the angular orientation of elastomer assemblies 303a and 303b. In this embodiment, it is preferred that support housing 313 houses an adjustment mechanism 317 for adjusting the angular orientation of elastomer assemblies 303a and 303b about respective central axes 314a and 314b in the directions of arrows D and E.

In this embodiment, it is preferred that adjustment mechanism 317 be a worm gear assembly having a worm 319 driven by a gear motor 321, and external gears 323a and 323b coupled to elastomer assemblies 303a and 303b, respectively. External gears 323a and 323b are configured to mate with and be simultaneously driven by worm 319. Gear motor 121 is configured to controlled and actuated remotely, for example, by a pilot in the cockpit of an aircraft. It is also preferred that adjustment mechanism 317 be configured such that elastomeric assemblies 303a and 303b counter-rotate, i.e., rotate in opposite directions.

One advantage to this configuration is that when both elastomer assemblies 303a and 303b are attached to a common point on a supported structure (not shown), lateral loads from each elastomer assembly 303a and 303b are cancelled out locally, and no net later force is introduced into the structure. This occurs when elastomer assemblies 303a and 303b are not oriented purely vertical. Variable stiffness support 301 provides for higher capacity as well.

It is apparent that an invention with significant advantages has been described and illustrated. Although the present invention is shown in a limited number of forms, it is not limited to just these forms, but is amenable to various changes and modifications without departing from the spirit thereof.

We claim:

1. A floor mounting system comprising:
   a base structure;
   a floor member;
   a variable stiffness support disposed between and coupled to the base structure and the floor member;
   the variable stiffness support having:
      a first rotatable housing;
      an elastomeric material disposed within the first housing; and
      a first rigid shim embedded within the elastomeric material; and
   an adjustment mechanism operably associated with the first housing;
   wherein the adjustment mechanism adjustably rotates the first housing that in turn rotates the elastomeric material and the first rigid shim; and
   wherein rotation of the first housing changes the stiffness of the variable stiffness support due to the changes in orientation positioning of the elastomeric material and the first rigid shim relative to the floor member.

2. The floor mounting system according to claim 1, further comprising:
   a bushing disposed within the elastomeric material.

3. The floor mounting system of claim 2, further comprising:
   a second rigid shim embedded within the first housing;
   wherein the first rigid shim and the second rigid shim extend relatively parallel to each other.

4. The floor mounting system of claim 3, wherein the first rigid shim is positioned at and extends alongside a first side of the bushing and the second rigid shim is positioned at and extends alongside a second opposing side of the bushing.

5. The floor mounting system according to claim 1, wherein the first housing has:
   an annular outer peripheral surface; and
   an inner surface having:
      a first inner chord surface; and
      a second inner chord surface spaced apart from and extending relatively parallel to the first chord surface.

6. The floor mounting system of claim 5, wherein the elastomeric material is disposed within an inner area formed by the inner surface of the first housing.

7. The floor mounting system according to claim 1, wherein the adjustment mechanism is a gear assembly comprising:
   a gear motor;
   a worm gear coupled to the gear motor; and
   an external gear matingly coupled to the worm gear, the external gear being coupled to the first housing;
   wherein actuation of the gear motor causes rotation of the first housing, thereby changing the stiffness of the elastomer assembly in selected directions.

8. The floor mounting system of claim 1, further comprising:
   a second rotatable housing;
   wherein the adjustment mechanism adjustably rotates the first housing and the second housing.

9. The floor mounting system of claim 8, wherein the first housing counter-rotates relative to the second housing.

* * * * *